United States Patent Office 3,488,867
Patented Jan. 13, 1970

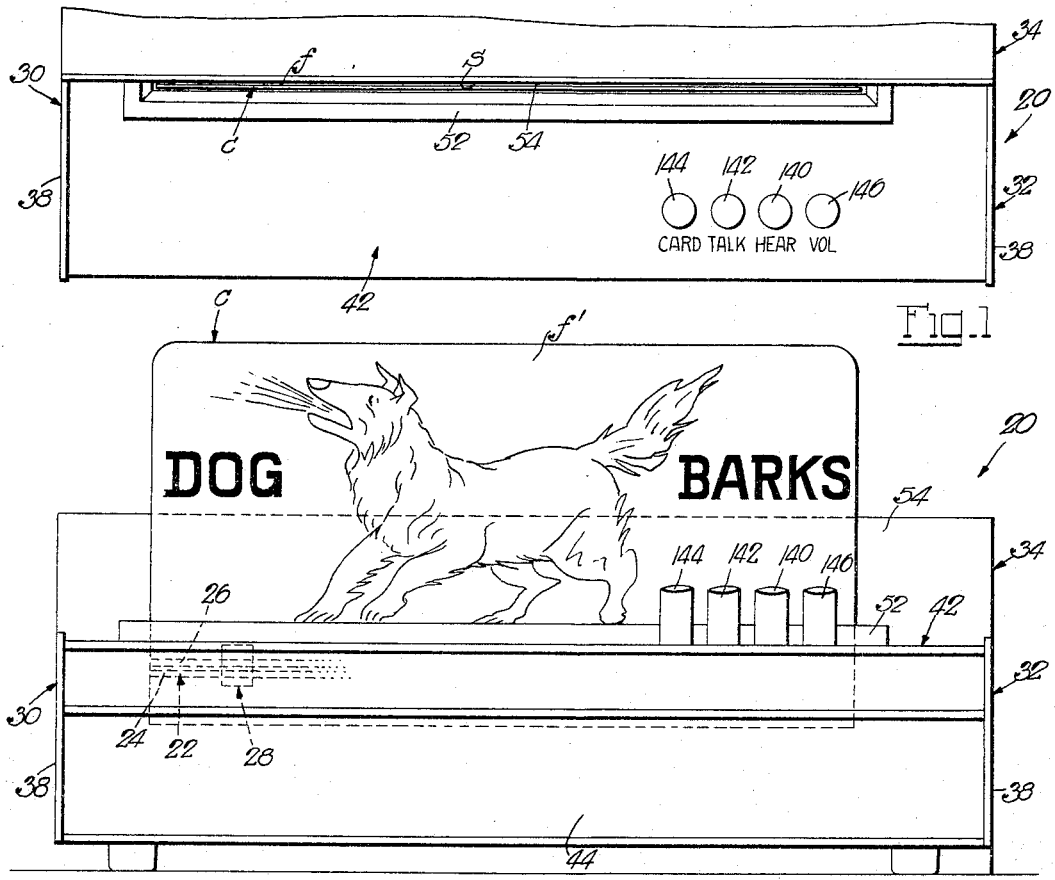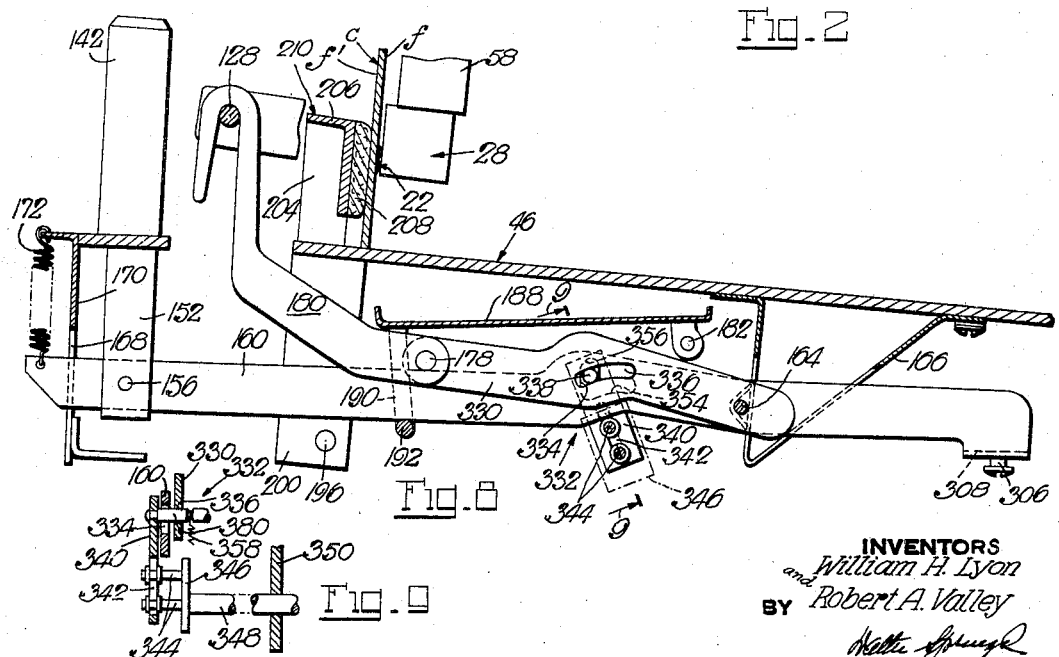

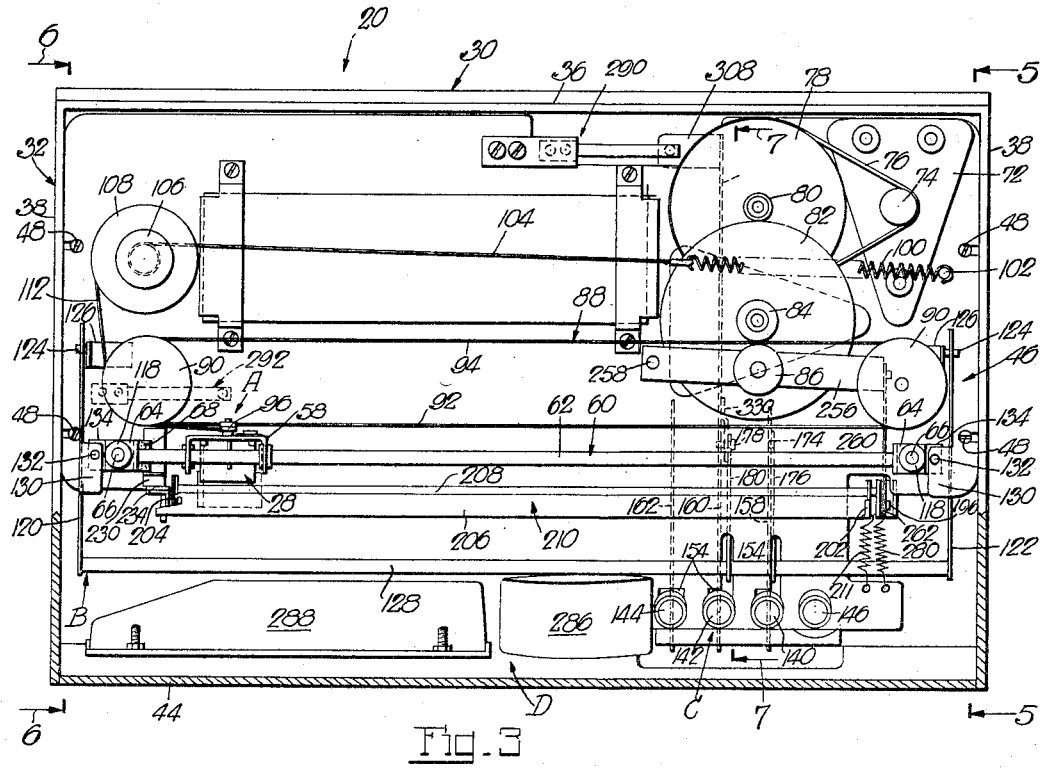
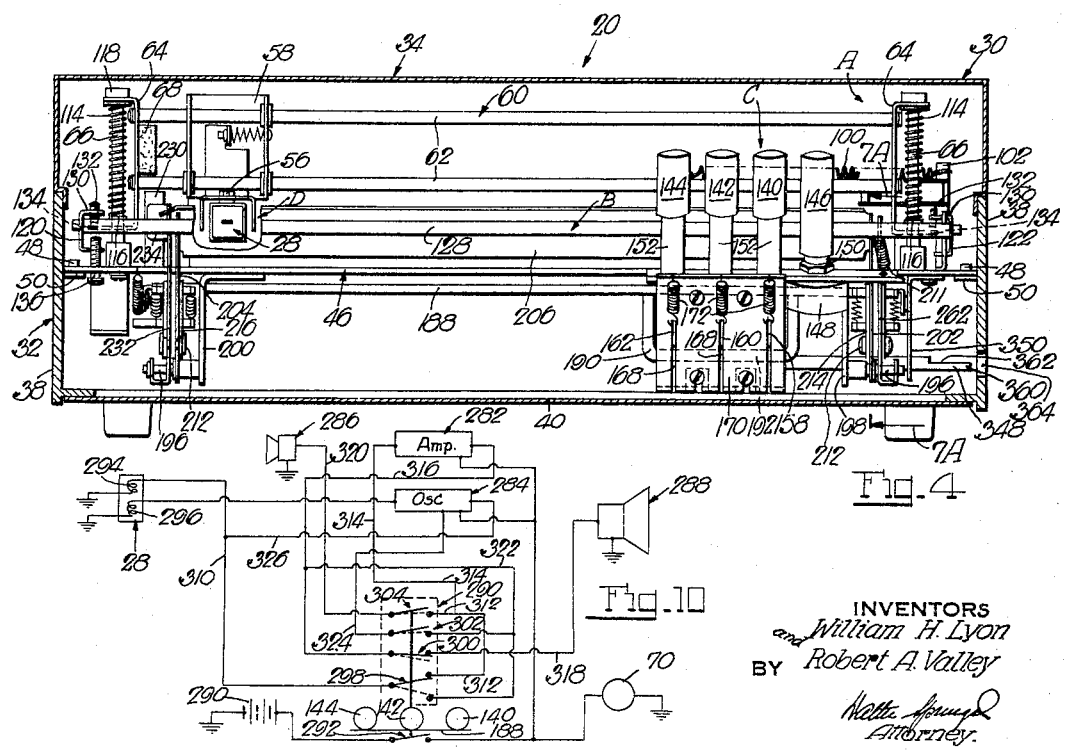

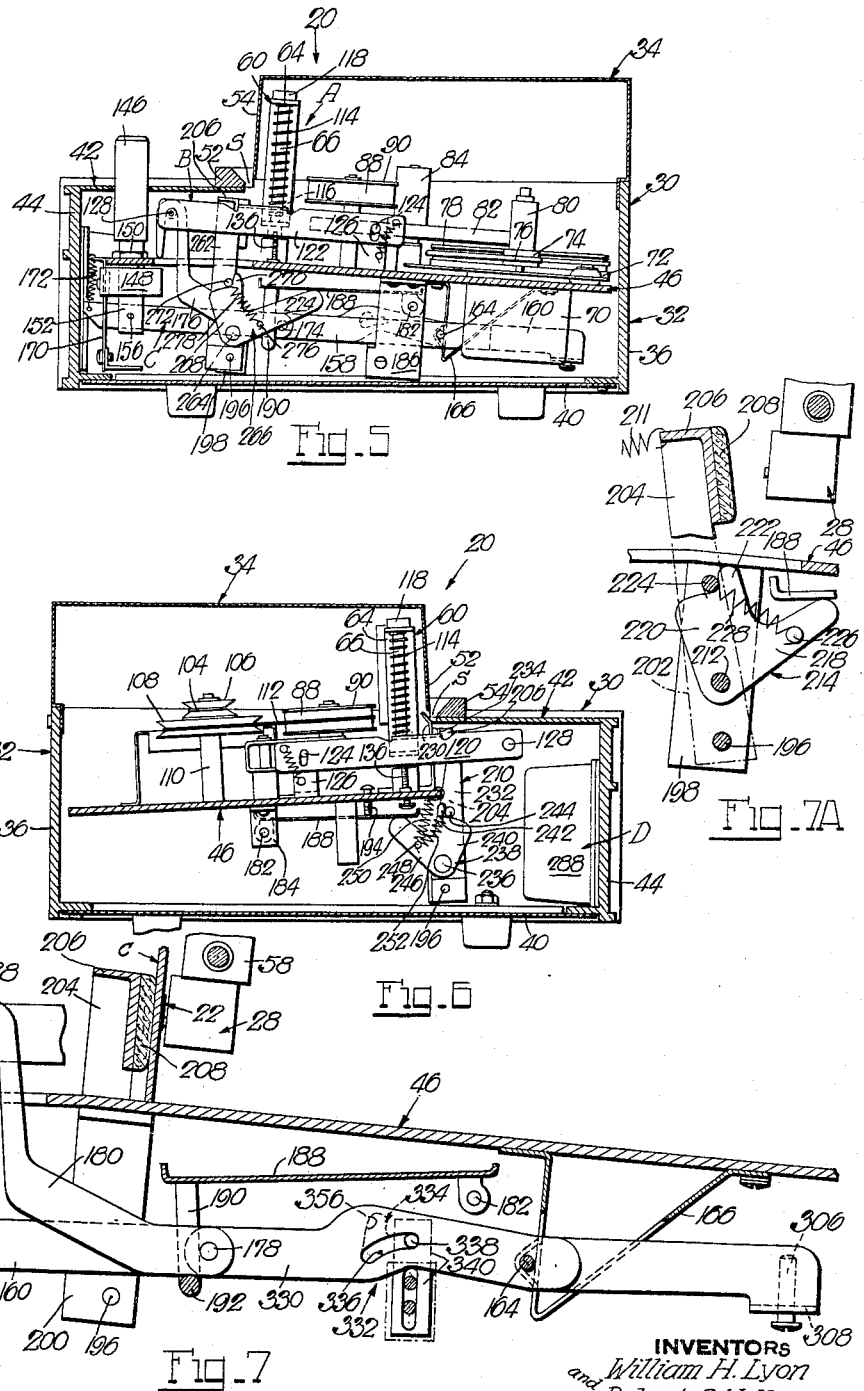

3,488,867
RECORDING-REPRODUCING APPARATUS FOR TEACHING CARDS
William H. Lyon, Woodbridge, and Robert A. Valley, Branford, Conn., assignors to KMS Industries, Inc., Ann Arbor, Mich., a corporation of Delaware
Filed May 15, 1968, Ser. No. 729,164
Int. Cl. C09b 19/00; C11b 5/00
U.S. Cl. 35—35                            14 Claims

ABSTRACT OF THE DISCLOSURE

A device having a slot in which is removably insertable a card having on the front face viewable pictorial and/or reading matter, and on its back face a magnetic tape lengthwise of the card and of a width to accommodate a master track with recorded master material and a spaced parallel student track for recording thereon and reproducing therefrom. Associated with the tape on an inserted card is a recording-reproducing head movable on a tape traverse track which, in turn, is movable transversely of the traverse direction from a normal position in cooperative relation with the master track into a practicing position in cooperative alignment with the student track. Control means serve for reproducing from the master track, for recording on the student track, and for reproducing from the student track, and a master key together with the control means permit recording on the master track.

---

This invention relates to tape recording and reproducing apparatus in general, and to apparatus of this kind of which the tape is provided on insertable cards.

The type of apparatus with which the present invention is concerned has provisions for removably receiving a card having on its front face viewable pictorial and/or reading matter, and having on its back face a magnetic tape lengthwise thereof and of a width to accommodate two spaced parallel tracks, of which one is a master track with preferably prerecorded master material thereon, and the other is a student practice track, with the apparatus having further provisions for recording on the student track and reproducing from either the master track or the student track. In a known prior apparatus of this type a card is inserted therein and on insertion will immediately be fed through the apparatus at uniform record-reproduce speed in order to reproduce from and record on the tape on the card. However, while this prior apparatus is satisfactory in its performance, the same is in a few but important respects unsatisfactory in its student teaching capacity. Thus, with this apparatus being intended for teaching especially, though not exclusively, students of kindergarten or elementary school age, it will be a more or less difficult task for average students of that age to concentrate on and understand the viewable matter, and especially readable matter, on the front face of the card while the same is in continuous motion, wherefore the apparatus detracts from the teaching capacity of the card. Also, once a card is inserted in the apparatus to start its lecture course, the student cannot temporarily stop the card's uninterrupted pass through the apparatus at any time, wherefore the student has no opportunity to pause upon a just reproduced particular master or student utterance and then continue the rest of the reproduction, or to interrupt recording on the student track while also stopping the card. While the student's inability to pause upon any just reproduced part of a complete recording before continuing with the rest of the reproduction deprives the student of one valuable tool for good and also facile learning, the student's inability to stop the card temporarily in its pass through the apparatus renders the student's task of recording on the student track particularly difficult, if not insurmountable. Thus, most students of such tender age become easily confused and ever momentarily dumb when called upon to express a thought in a brief measured time span, as is the case when such a student contemplates recording on the student track on the card and helplessly watches the latter move inescapably toward the end of its pass through the apparatus. Further, a student cannot at will reverse the normal feed of a card in the apparatus and restore normal feed of the same, wherefore a student is deprived of a valuable tool in immediately repeating any part of a reproduction from the tape on the card. Repeat of any part of a reproduction is at all possible only after the card leaves the apparatus and the student reinserts the same for another reproduction pass through the apparatus, and the advantages of virtual immediacy of so repeating are, of course, unattainable.

It is the primary aim and object of the present invention to provide apparatus of this type in which an inserted card remains stationary for its entire lecture course, and provisions are made for the recording-reproducing head to traverse either the master track or the student track under the student's control and quite independently from the insertion of the card in the apparatus. With this arrangement, the motionless card will display the viewable matter on the front face thereof to the student to best advantage, and the student may give undivided attention to the displayed matter on the card without reproducing from or recording on the tape in back thereof, or the student may perform these tasks simultaneously or in any desired sequence best suited to the learning capacity of the particular student of any particular age.

It is another object of the present invention to provide apparatus of this type in which the aforementioned student control of the traverse motion of the recording-reproducing head over either the master track or the student track also permits instantaneous reversal of the head on its traverse and also instantaneous resumption of its traverse motion in any and all positions within its traverse range, thereby enabling the student to acquire or master in the shortest possible time and with the least effort any particular aspect of the audio lecture on the card which may be found more difficult by the student than other aspects thereof.

It is a further object of the present invention to provide apparatus of this type in which spring means normally hold the recording-reproducing head in a record-reproduce starting position with respect to the master and student tracks on an inserted card and urge the head into this starting position from any position in its traverse range, and there is provided for traverse motion only of the head a one-directional power drive of constant record-reproduce speed, with this drive having a clutch which under student control is engaged and disengaged to effect traverse motion of the head and release of the same for spring-return to its starting position, respectively. With this arrangement, a simple non-reversible constant-speed power drive and a simple spring will effect traverse and reverse motion of the head, and spring-effected reverse motion of the head may be, and preferably is, at much greater speed than its traverse motion so that unproductive time of reverse motion of the head, either for return to its starting position after a full traverse of the master or student track or for repeat reproduction of any recorded part on either track, is particularly short. Further, with the student controlling disengagement of the clutch for the purpose of stopping recording on or reproducing from the tape, and with spring-return of the head to starting position being entirely automatic on such clutch disengagement, the student is relieved of any task in the return motion of the head unless he or she wants to epeat the reproduction of any intermittent part of the ecording on either the master track or the student track.

Another object of the present invention is to provide apparatus of this type in which with the available controls a blank master track on an inserted card may be recorded on, but only through intermediation of an insertable master key. With this arrangement, a teacher may record his or her personal lectures on the master racks of cards for teacher-supervised students, and may also change these lectures if, as in most cases, an erase head will erase a recording on either track ahead of recording thereon.

A further object of the present invention is to provide apparatus of this type which is structurally simple and of relatively low cost, is quite rugged and will reliably perform even on clumsy or more or less rough handling by some youngsters, and has a minimum number of particularly simple and foolproof controls well suited for their correct manipulation by even the youngest students for which the learning procedure afforded by the apparatus is intended.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a fragmentary top view of recording-reproducing apparatus embodying the invention;

FIG. 2 is a front view of the same apparatus;

FIG. 3 is another top view of the apparatus with a top part removed and part of the housing broken away to show normally concealed parts of the apparatus;

FIG. 4 is another front view of the apparatus with part of a top part and part of the housing broken away to show normally concealed parts of the apparatus;

FIGS. 5 and 6 are cross-sections through the apparatus taken substantially on the lines 5—5 and 6—6, respectively, in FIG. 3;

FIG. 7 is an enlarged fragmentary section through the apparatus taken substantially on the line 7—7 of FIG. 3;

FIG. 7A is an enlarged fragmentary section through the apparatus taken substantially on the line 7A–7A of FIG. 4;

FIG. 8 is a section similar to FIG. 7, but showing certain parts in different operating positions;

FIG. 9 is a fragmentary section taken substantially on the line 9—9 of FIG. 8; and FIG. 10 is a wiring diagram of certain prominent electrical operating devices of the apparatus.

Referring to the drawings, and more particularly to FIGS. 1 to 6 thereof, the reference numeral 20 designates recording-reproducing apparatus with which to record on and reproduce from a teaching card $c$ which is removably insertable in the apparatus. To this end, the card $c$ has on its back face $f$ a magnetic tape 22 with parallel student and master tracks 24 and 26 (FIG. 1 and 2), and the apparatus has a recording-reproducing head 28 to cooperate with either track on an inserted card in recording on and reproducing from the student track 24 and in reproducing from the master track 26. The card $c$ bears on its front face $f'$ any conceivable teaching matter intended for a student of a particular age, and especially, though not exclusively, of kindergarten or elementary school age. The front face of the present card bears, in this instance, the picture of a barking dog and the printed legend "DOG BARKS," with the picture and legend being in the inserted condition of the card fully exposed to the view of a student in front of the apparatus (FIG. 2) to encourage the student correctly to read the legend with or without the aid of the picture. The master track 26 in back of the card will usually hold a master's or teacher's recorded material dealing with the general subject matter of the card, i.e., a dog, and the student is induced to reproduce the master recording in order to acquire whatever teaching it contains. The student is also urged to record on the student track 24 his or her imitation of the master recording or any other matter relevant to a dog, and then to reproduce from the student track.

The present apparatus provides a housing 30 in which most of the operating and other devices are provided in concealed fashion. For ready mounting of the various operating and other devices in the housing 30 and also ready accessibility to the same, the housing is made of several sections, comprising in this instance a rectangular base frame 32 and a top cover 34. The base frame 32 has in this instance integral back and opposite side walls 36 and 38, respectively, a removable bottom 40, and a separate top shelf 42 and therewith integral front wall 44 which are removably mounted between the side walls 38, with the top shelf 42 being at the bottom level of the top cover 34.

With a few exceptions, the operating and other devices of the apparatus are preassembled on a chassis 46 before the latter is mounted in the housing 30. The chassis 46 is essentially a mounting plate which at 48 is screwed to inward lugs 50 on the side walls 38 of the housing (FIGS. 3 and 4). For insertion of a card $c$ into the apparatus, there is provided a slot $s$ which is formed in this instance by a recessed strip 52 on the top shelf 42 and the adjacent front wall 54 of the top cover 34 (FIGS. 1, 5 and 6), with the card $c$ being widthwise passed through the slot $s$ and coming to rest edgewise on the plate 46 in upright disposition (FIGS. 2 and 7).

Among the various operating and other devices of the apparatus are a Head Traverse Device A and a Head Shift Device B (FIGS. 3 to 5), Controls C for the devices A and B (FIGS. 3 to 5), and Recording and Reproducing Components and Controls D (FIGS. 3, 4 and 6).

HEAD TRAVERSE DEVICE A

The recording-reproducing head 28 is at 56 mounted on a carriage 58 which is slidable, longitudinally of an inserted card $c$, and more particularly parallel to the magnetic tape 22 on the back face thereof, on a track 60 which is in the form of two spaced parallel rods 62 that are anchored to opposite end brackets 64 on upright posts 66 on the plate 46 (FIGS. 3 to 5). The motion of the head 28 on the track 60 is within a traverse range which extends substantially over the tape 22 on an inserted card, and motion of the head is for recording and reproducing at uniform record-reproduce speed in the direction from left to right in FIGS. 3 and 4, and is in the opposite direction for return of the head to its record-reproduce starting position in which its carriage 58 rests against a stop 68 on the left end bracket 64 of the track (FIG. 4). For traverse motion of the head 28 in record-reproduce direction, there is provided a power drive originating at a constant-speed motor 70 carried by an adjustment plate 72 on the chassis 46 (FIGS. 3 and 5) and having a pulley 74 which by a belt 76 drives a larger pulley 78 that is rotatably mounted on the chassis 46. Rotatable coaxially with the pulley 78 is a drive wheel 80 which is in driving engagement with the periphery of a larger wheel 82 that is also rotatably mounted on the chassis 46 and carries a smaller coaxial drive wheel 84. The drive wheel 84, which is thus driven from the motor 70 at reduced speed, is one of a pair of pinch rolls of which the other, idler, roll 86 is normally retracted from a belt 88 between the rolls, but is advanceable to force the belt into driving engagement with the driven roll 84. The belt 88 is led over rotary pulleys 90 which are suitably mounted on the chassis 46 and divide the belt therebetween into front and rear runs 92 and 94, of which the front run 92 is at 96 drivingly connected with the head carriage 58 and the rear run 94 passes between the rolls 84 and 86. The rolls 84 and 86 thus serve as an engageable and disengageable clutch in the drive of the head 28, with the latter being moved on its track 60 in record-reproduce direction at uniform record-reproduce speed on engagement of this clutch, i.e., on advancing the roll 86 to force the belt into driving engagement with the driven roll 84.

For return motion of the head 28 to its starting position, there is provided a return spring 100 which is at one end anchored to a post 102 on the chassis 46 (FIGS. 3 and 4) and has secured to its other end a flexible cable 104 which is wound on a sheave 106 and also anchored to the latter with its other end. Turnable with the sheave 106 is a larger sheave 108, and both are rotatably mounted on a post 110 on the chassis 46 (FIG. 5). Anchored with one end on the sheave 108 and partly wound thereon is another flexible cable 112 which is led over the left pulley 90 on top of the belt 88 thereon and is with its other end anchored at 96 to the head carriage 58. The spring 100 is preloaded so as to act, through intermediation of the cables 104 and 112, in returning the head 28 to its starting position in which its carriage 58 rests against the stop 68 which preferably is of a shock absorbing material, such as felt, to cushion the impact of the returning carriage 58. Spring-return of the head 28 to its starting position is, of course, much faster than its record-reproduce speed in the opposite direction, and spring-return of the head from any position in its traverse range other than starting position will occur immediately on retraction of the pinch roll 86 from the belt 88, as will be readily understood. Also, deflection of the spring 100 for return of the head 28 over its full traverse range is less than this range at the diametrical ratio of the sheaves 106 and 108 to make for a correspondingly smaller variation in the force of the spring over its action range.

HEAD SHIFT DEVICE B

As already mentioned, the recording-reproducing head 28 is adapted to record on and reproduce from the student track 24 and also reproduce from the master track 26 (FIG. 2), requiring therefore that the head be shiftable from operative alignment with either track into operative alignment wth the other track. To this end, the head-carrying track 60 is in this instance movable transversely of the traverse direction of the head by being slidable on the posts 66, and the track 60 is by springs 114 normally urged into an upper position (FIG. 4) in which the head 28 is in recording relation with the master track 26 on an inserted card c (FIG. 2). The springs 114, which surround the posts 66, rest with their lower ends on collar 116 on these posts and with their upper ends engage and urge the end brackets 64 of the track into engagement with heads 118 on these posts.

Provided on opposite ends of the track 60 are arms 120 and 122 which at 124 are floatingly pivotally mounted on brackets 126 on the chassis 46 (FIGS. 3 to 6), and are connected at their forward ends by a rod 128. Provided on the arms 120 and 122 are side lugs 130 with set screws 132 with which to engage bottom lugs 134 on the end brackets 64 of the track 60 to shift the latter and head 28 thereon, on downward swing of the arms 120, 120 at the rod 128, into a lower position in which the head is in record-reproduce relation with the student track 24 on an inserted card (FIG. 2). To bring the head 28 into accurate record-reproduce relation with the student track 24 on downward swing of the rod 128 and therewith connected arms 120 and 122, adjustable set screws 136 on the chassis 46 serve as stops for the downswinging arms 120 and 122 (FIGS. 4 to 6), with overswing of these arms at their rod 128 causing the former to pivot on the respective stops 136 as permitted by the floating pivot mounts 124 of these arms.

CONTROLS C

Among the controls are four manipulatable members 140, 142, 144, 146 in the form of exemplary buttons which project above the top shelf 42 of the housing 30 and are identified by nearby printed legends "HEAR," "TALK," "CARD" and "VOL," respectively (FIGS. 1 and 2). The buttons 140, 142 and 144 are depressible for reproducing from the student track 24, for recording on this student track, and for reproducing from the master track 26, respectively, on an inserted card, while the button 146 is turnable for operating a volume control 148. The volume control 148 is at 150 mounted on the chassis 46 near its forward end (FIGS. 3 to 5). The other buttons 140 to 144 have depending shanks 152 which extend htrough clearance apertures 154 in the chassis 46 (FIG. 3) and are pivotally connected at 156 with levers 158, 160 and 162, respectively (FIGS. 3 to 5, 7 and 8), which in turn are pivotally mounted at 164 on a depending strap 166 on the chassis 64. The levers 158 to 162 extend through slots 168 in a depending skirt 170 on the chassis 46 and are with their front ends normally urged by springs 172 against the top walls of the respective slots 168 at which the respective buttons 140 to 144 are in their inoperative upwardly-projected positions (FIGS. 2 and 4). Lever 158 pivotally carries at 174 a link 176 which hooks over the rod 128 (FIGS. 3 and 5) so that on depression of the associated "HEAR" button 140 the track 60 is lowered to bring the head 28 into record-reproduce relation with the student track 24 on an inserted card. Lever 160 pivotally carries at 178 a similar link 180 which also hooks over the rod 128 so that on depression of the associated "TALK" button 142 the track 60 is also lowered to bring the head 28 into record-reproduce relation with the student track on an inserted card (FIGS. 3 and 7). Finally lever 162 is exactly like lever 158 (FIG. 5), except that lever 162 has no link connection with the rod 128 so that on depression of the associated "CARD" button 144 the head 28 remains in reproducing relation with the master track 26 on an inserted card (FIG. 2).

Pivotally mounted at 182 on depending straps 184 and 186 on the chassis 46 is an actuator plate 188 (FIGS. 4 to 7) which has a depending U-strap 190 the middle leg 192 of which passes underneath, and preferably has slight clearance from, the levers 158 to 162 when the latter are in their inoperative or non-depressed position (FIG. 5), with the actuator plate 188 being normally urged by spring means to-be-described into the inoperative position in FIGS. 5 and 6 in which the same rests against an adjustable set screw 194 for desired clearance of the strap leg 192 from the levers 158 to 162.

Pivotally mounted at 196 on depending straps 198 and 200 on the ehassis 46 are arms 202 and 204 (FIGS. 3 to 6) which on top are connected by a bar 206 carrying a pressure pad 208 which extends over the entire traverse range of the head 28, with the arms 202, 204, bar 206 and pad 208 thereon forming a swingable unit 210 which is normally retracted by a spring 211 (FIG. 3) and advanceable into a position to bring the pad 208 into backing relation with an inserted card and hold either track 24 or 26 thereon in light contact with the head 28 for recording or reproducing (FIG. 7). To thus advance this unit 210, the arms 202 and 204 thereof pivotally carry at 212 identical bellcrank levers 214 and 216 (FIG. 4) of which lever 214 is shown enlarged in FIG. 7A in its association with arm 202. Lever 214 has two arms 218 and 220 of which arm 218 is in follower relation with the actuator plate 188, and arm 220 has a finger 222 in the path of a pin 224 on the arm 202. Anchored to the pin 224 and to a pin 226 on the lever 214 is a preloaded spring 228 which normally urges the finger 222 on the lever 214 and the pin 224 on the arm 202 into engagement with each other. The retract spring 211, while being weaker than the spring 228, will in the inoperative position of the actuator plate 188 nevertheless force the pressure unit 210 into the retracted position in FIG. 7A in which the arm or leg 218 of lever 214 is held in follower relation with the actuator plate 188. The opposite lever 216 (FIG. 4) is coordinated with its associated arm 204 in the same manner as the lever 214 is coordinated with its associated arm 202 (FIG. 7A). Accordingly, on depressing either one of the buttons 140, 142 or 144 for reproducing from the student track, reording on the student track, and reproducing from the master track, respectively, on an inserted card, the respective lever 158, 160 or 162 will depress the actuator plate 188 at its strap leg 192 into the operative position in FIG. 7 in which the levers 214 and 216 in follower relation therewith are swung clockwise in FIG. 7A to permit the springs 228 to overpower the retract spring 211 and urge the pressure pad 208 against an inserted card in light contact with the head 28 (FIG. 7).

Provisions are also made to clamp an inserted card against a fixed back stop 230 (FIGS. 3, 4 and 6) so as to prevent the card from being dragged along by the traversing head 28 over the preferred slight longitudinal freedom the card has in the insertion slot s for its facile insertion (FIG. 1). To this end, there is also pivotally mounted at 196 to the strap 200 on the chassis 46 a clamp arm 232 with a clamping pad 234 (FIGS. 3, 4 and 6). Pivotally mounted at 236 on the arm 232 is a bellcrank lever 238 (FIG. 6) of which an arm 240 has a finger 242 to cooperate with a pin 244 on the clamp arm 232, and the other arm 246 of the bellcrank lever carries a pin 248. Anchored to this pin 248 and to the chassis 46 are the ends of a preloaded spring 250 which acts to keep the lever 246 in follower relation with the actuator plate 188 and also normally hold the latter in its inoperative position at rest against the set screw 194 (FIG. 6). Also anchored to the pins 244 and 248 on the clamp arm 232 and bellcrank lever 238 are the ends of another preloaded spring 252 which normally holds the pin 244 and finger 242 on the respective arm 232 and lever 238 in engagement with each other. Thus, with the actuator plate 188 being in its inoperative position (FIG. 6), the clamp arm 232 is held in retracted position. However, on depressing either one of the buttons 140, 142 or 144 and ensuing depression of the actuator plate 188 through intermediation of the respective lever 158, 160 or 162, the bellcrank lever 238 and clamp arm 232 will follow the depressed actuator plate in the course of which the pad 234 on the clamp arm 232 will shift the inserted card into engagement with the back stop 230 and clamp the same thereagainst with adequate force from the then operative spring 252, as will be readily understood.

The earlier described idler roll 86 is, for its shiftability to and from driving relation with the associated driven roll 84 and belt 88 therebetween (FIG. 3) carried by an arm 256 which at 258 is pivotally mounted on the chassis 46. This arm 256 is by a link 260 connected with the upper end of an arm 262 which is at 196 pivotally mounted with its lower end on the strap 198 on the chassis 46 (FIGS. 3 and 5). Pivoted at 264 on the arm 262 is a bellcrank lever 266, one arm 268 of which has a finger 270 normally in engagement with a pin 272 on the arm 262 (FIG. 5), and the other arm 274 carries a pin 276. Anchored with its opposite ends to the pins 272 and 276 is a preloaded spring 278. The arm 262 is by a spring 280 (FIG. 3) normally urged into the retracted position in FIG. 5 in which the idler roll 86 is retracted from driving relation with the driven roll 84 and belt 88 therebetween (FIG. 3). However, on depressing any one of the control buttons 140, 142 or 144 and ensuing depression of the actuator plate 188, the bellcrank lever 266 and arm 262 will be swung clockwise about their respective pivot supports (FIG. 5) in the course of which idler roll 86 will be advanced from its retracted position to urge the belt 88 into driving engagement with the driven roll 84 with the force of the spring 278.

RECORDING AND REPRODUCING COMPONENTS AND CONTROLS D

Reference is now had to FIG. 10 which diagramatically illustrates these components and controls and also the circuitry of the electrical components thereof. These components are the recording-reproducing head 28, an amplifier 282, an oscillator 284, a microphone 286 and a loudspeaker 288 (see also FIG. 3), a switch stack 290 (see also FIG. 3), the drive motor 70, the control buttons 140, 142 and 144, the actuator plate 188, and a battery 290 and normally-open power supply switch 292 (see also FIG. 3). The head 28 is in this instance provided not only with a recording-reproducing part 294 but also with an erase part 296 which is to erase recorded matter on the student track 24 on an inserted card just ahead of rerecording on the same track. The switch stack 292 comprises the ganged switches 298, 300, 302 and 304, and they normally assume the full-line positions in FIG. 10. These same switches will be actuated into the dotted-line positions in FIG. 10 on depression of the "TALK" button 142 by a set screw 306 on a rearward extension 308 on the lever 160 which is associated with the "TALK" button 142 (FIGS. 3 and 7).

As already explained, on depressing either one of the buttons 140 to 144 for reproducing from or recording on the student track 24 or for reproducing from the master track 26, respectively, on an inserted card, the card is clamped to the back stop 230 by the clamp arm 232 and is also held in light contact with the head 28 by the pressure unit 210, and the pinch rolls 84, 86 drivingly engage the belt 88 therebetween. In addition, the then depressed actuator plate 188 will close the normally-open power supply switch 292 to connect the battery 290 with the drive motor 70, the amplifier 282 and the oscillator 284. Additionally, on depressing either one of the "HEAR" or "TALK" buttons 140 or 142, the head 28 will be lowered into record-reproduce relation with the student track 24 on an inserted card preferably just before the latter is clamped to the back stop 230 and pressed into light contact with the head 28.

With the operations just described taking place on depression of either of the buttons 140, 142 or 144, let it be assumed that a student wishes to listen to the recording on the master track 26 on an inserted card and to that end depresses the "CARD" button 144. With the head 28 being then moved at a record-reproduce speed from its starting position and being also in reproducing relation with the master track 26, signals generated in the head part 294 and corresponding to the recorded signals on the master track are transmitted to the input of the amplifier 282 via lead 310, stack switch 298 in its full-line position, and leads 312 and 314, with the output of the amplifier being transmitted to the loudspeaker 288 via lead 316, stack switch 300 in its full-line position, and lead 318. The student will thus listen to the reproduced master recording and at or near the end of the reproduction simply release the depressed button 144 for its spring-return to inoperative position and ensuing spring-return of the head 28 to its starting position. Of course, the student may interrupt a master reproduction at any time before its completion by timely release of the depressed button 144, and may also so interrupt a master reproduction and immediately repeat a part thereof last heard again by timely release of the depressed button 144 and redepression of the same button, as will be readily understood.

Let it now be supposed that the student wishes to record on the student track 24 on an inserted card, the student will depress the "TALK" button 142, in which case the head 28 will also be lowered into record-reproduce relation with the student track. The signals generated in the microphone 286 in response to the student's voice will be transmitted via lead 320, the then closed stack switch 304 and leads 312 and 314 and pass through the amplifier 282 and from there through leads 316 and 322, stack switch 302 in its then closed position and lead 324 to the oscillator 284 where they will mix with the bias oscillations and thence pass through leads 326 and 310 to the head part 294 for recording on the student track 24. With the erase part 296 of the head 28 being then also operative, any previously recorded matter on the student track will, of course, be erased ahead of the student's present recording thereon.

If the student wishes to listen to his or her own recording on the master track, the student simply depresses the "HEAR" button 140, in which case the head 28 is again lowered into record-reproduce relation with the student track 24 on the inserted card, with the signals then generated in the head part 294 being transmitted to the loud speaker 288 in the same manner previously described in connection with reproducing from the master track 26, as will be readily understood.

While cards intended for the present apparatus will have master recordings on the master track, provisions are also made to erase a recording, and rerecord, on the master track, but only by a master or teacher. To this end, the link 180 associated with the "TALK" button 142 is at 178 pivotally connected, not with the also associated lever 160, but with an auxiliary lever 330 (FIGS. 3, 7 and 8) which is next to, and at 164 pivoted coaxially with, the lever 160, and there is provided between the levers 160 and 330 a coupling 332 which is engageable to lock lever 330 in follower relation with lever 160 (FIG. 7), and is disengageable to release lever 330 from follower relation with lever 160. The coupling 332 provides in this instance slots 334 and 336 in the respective levers 160 and 330 remote from their common pivot support 164, and a pin 338 which is shiftable in the slots 334 and 336. The pin 338 is carried by an arm 340 (FIGS. 7 to 9) having a longitudinal slot 342 through which extend pins 344 on a rocker 346 having a shaft 348 journalled in depending straps 198 and 350 on the chassis 46 (FIGS. 4 and 9). The arm 340 is thus turnable with the rocker 346 on the shaft 348 and is also slidable on the rocker 346 radially of the shaft 348 to the extent permitted by the free-motion range of the pins 344 in the slot 342 in the arm 340. The slot 336 in the auxiliary lever 330 is preferably arcuate about the shaft 348 when the associated "TALK" button 142 is in inoperative position, and the slot 334 in the lever 160 is of bayonet-type, having a longitudinal branch 354 which is also arcuate about the shaft 348, and a lateral end branch 356, of which the longitudinal slot branch 354 is in alignment with the slot 336 in the other lever 330 and the pin 338 extends through both of these in the coupled relation of the levers 160 and 330 (FIG. 7) so that on depression of the "TALK" button 142 the auxiliary lever 330 will follow the lever 160 and the link 180 on the lever 330 will depress the rod 128 and thereby cause lowering of the head 28 into record-reproduce relation with the student track 24 on an inserted card. This is the normal relation between the levers 160 and 330 for recording on the student track when the "TALK" button 142 is depressed (FIG. 7), with the arm 340 being by a spring 358 normally urged into the coupling-engaged position in FIG. 7. As shown in FIG. 4, the end 360 of the shaft is partially flattened at 362 and is concealed in the housing 30 and, hence, normally inaccessible except with a master key through a small opening 364 in the side of the housing. Therefore, if a master or teacher wishes to record on the master track 26 on an inserted card, he or she inserts through the opening 364 a master key (not shown) having a socket formation to fit over the flattened shaft end 360 with which to turn shaft 348 to bring pin 338 into alignment with the lateral end branch 356 of the slot 334 in the lever 160 so that on subsequent depression of the "TALK" button 142 and ensuing depression of the lever 160 the pin 330 will not follow the latter because of its clearance therefrom in the slot end branch 356 (FIG. 8), with the result that the head 28 will remain in record-reproduce relation with the master track 26 on the inserted card. With the master or teacher thus uncoupling the auxiliary lever 330 from the lever 160 and depressing the "TALK" button 142, he or she may record directly on the master track by speaking into the microphone 286, with any prerecorded matter on the master track being then also erased ahead of the recording in progress thereon. On release of the "TALK" button 142 and ensuing return of the lever 160 to its inoperative position, the auxiliary lever 330 will automatically be recoupled to the lever 160 by the spring 358, as will be readily understood.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In recording-reproducing apparatus for cards with two spaced parallel magnetic tracks on one face, the combination of a housing in which removably to insert a card in a fixed position therein; a recording-reproducing head member; a track member on which said head member is reciprocable in a direction parallel to the tracks on an inserted card and one of said members being movable transversely of said direction into first and second positions in which said head member is in record-reproduce relation with first and second tracks, respectively, on an inserted card, with said one member being normally urged into said first position; a devicce operable to shift said one member into said second position; a preloaded spring normally urging said head member on said track member in one direction into a record-reproduce starting position; a power drive including a clutch engageable and disengageable for moving said head member on said track member at uniform record-reproduce speed in a direction opposite to said one direction and for releasing said head member for spring-return into said starting position, respectively, with said clutch being normally disengaged; and first and second control means independently manipulatable to engage said clutch and to operate said device and also engage said clutch, respectively.

2. The combination in recording-reproducing apparatus as in claim 1, in which said one member is said track member.

3. The combination in recording-reproducing apparatus as in claim 1, in which said control means include handle elements, respectively, and said members, device, spring, power drive, and control means except said handle elements, are located in said housing in concealed fashion.

4. The combination in recording-reproducing apparatus as in claim 3, in which said housing has a front, back and a top with a card insertion slot therein closer to said front than to said back, with said slot also serving to hold an inserted card substantially vertically in said fixed position, and said head member is between said slot and the back of said housing.

5. The combination in recording-reproducing apparatus as in claim 1, in which said power drive further includes an electric motor with a circuit having a normally open switch which when closed closes said circuit, and said first and second control means also closing said switch on manipulation of either control means.

6. The combination in recording-reproducing apparatus as in claim 1, which further provides recording and reproducing means, including said head member, an oscillator, an amplifier, and control switches normally in positions for connecting said head member and amplifier for reproducing, and operable into different positions for connecting said head member, oscillator and amplifier for recording, said first control means includes a control element manipulatable to engage said clutch, and said second control means provides two other control elements independently manipulatable to operate said device and also engage said clutch, with one of said other elements when manipulated also operating said control switches.

7. The combination in recording-reproducing apparatus as in claim 6, which further provides means including another normally-open control switch supplying said oscillator and amplifier with battery power when said other control switch is closed, and said other control switch is closed on manipulation of either of said control elements.

8. The combination in recording-reproducing apparatus as in claim 7, in which said power drive further includes an electric motor with a circuit having a further normally open control switch which when closed closes said circuit, and said further control switch is closed on manipulation of either of said control elements.

9. The combination in recording-reproducing apparatus as in claim 5, in which said housing has a top with a slot therein through which to insert a card widthwise into the housing in upright position therein in which it extends through said slot, with said slot being longer than, and of a width greater than the thickness of, a card, and there are further provided a stop near said head member in its starting position and in confronting relation with any card extending through said slot, a normally retracted pressure bar operable into an active position in which to engage the other face of an inserted card and hold the latter in uniform contact with said head member in any position of the latter in its reciprocatory direction, and a normally retracted clamp element operable to clamp an inserted card against said stop, with said first control means being manipulatable to first operate said pressure bar and clamp element and engage said clutch and then close said switch, and said second control means being manipulatable to first operate said device, then operate said pressure bar and clamp element and engage said clutch, and finally close said switch.

10. The combination in recording-reproducing apparatus as in claim 6, in which said second control means includes first and second coaxially pivoted levers, of which said first lever is operatively connected with said one element to swing on manipulation of the latter into an operative position in which to operate said control switches, and said second lever is operatively connected with said device, and a coupling between said levers for swing motion of said second lever with said first lever to operate said device on manipulation of said one element, with said coupling being releasable so that on manipulation of said one element said head member is in record relation with said first track on an inserted card.

11. The combination in recording-reproducing apparatus as in claim 10, in which said coupling provides a bayonet slot in one of said levers remote from said common pivot axis and a pin carried by the other lever for movement longitudinally thereof and projecting into said bayonet slot, with the latter having a first branch longitudinally of said one lever and an end branch transversely of said first branch, with said pin coupling said levers when projecting into said first slot branch and uncoupling said levers when projecting into said slot end branch.

12. The combination in recording-reproducing apparatus as in claim 1, in which said power drive includes two spaced idler pulleys with an endless belt thereon having between said pulleys opposite runs of which one run extends parallel to said track member and has a driving connection with said head member, companion pinch rolls forming said clutch, with the other belt run extending between said rolls of which one is driven and the other is an idler movable to and from operative position in which to hold said other belt run in driving engagement with said driven roll, and said preloaded spring is a tension spring fixedly anchored at one end and having secured to its other end a flexible cable led over one of said pulleys on top of the belt thereon and connected with said head member.

13. The combination in recording-reproducing apparatus as in claim 12, in which there is provided a yielding stop against which said head member is spring-returned into said starting position.

14. The combination in recording-reproducing apparatus as in claim 12, in which there is further provided a pair of sheaves turnable about a common axis of which one sheave is of larger diameter than the other sheave, and said cable is provided in first and second separate sections anchored to said spring and connected with said head member, respectively, of which said first cable section is fixed to and wound on said one sheave, and said second cable section is fixed to and wound on said other sheave and led over said one pulley.

References Cited

UNITED STATES PATENTS

| | | |
|---|---|---|
| 2,849,542 | 8/1958 | MacChesney. |
| 3,348,320 | 10/1967 | Brokaw. |
| 3,412,483 | 11/1968 | Jacobs. |

EUGENE R. CAPOZIO Primary Examiner

W. H. GRIEB, Assistant Eaxaminer

U.S. Cl. X.R.

179—100.2; 274—4